United States Patent Office 3,661,849
Patented May 9, 1972

3,661,849
HETEROCYCLIC POLYIMIDES PREPARED FROM HETEROCYCLIC DIAMINES
Billy M. Culbertson, Burnsville, Minn., assignor to Ashland Oil & Refining Company, Ashland, Ky.
No Drawing. Filed Oct. 6, 1965, Ser. No. 493,564
Int. Cl. C08g 20/32
U.S. Cl. 260—47 CP          13 Claims

ABSTRACT OF THE DISCLOSURE

Novel, heterocyclic ring-containing polyimides, useful in the formation of films and fibers are formed by reacting aromatic tetracarboxylic acid anhydrides with diamines having the following formula

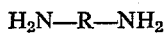

wherein R is a divalent radical containing from one to two benzoxazole, benzimidazole, or benzothiazole moieties, said divalent radical containing at least two aromatic ring structures, the amine groups of said diamine being attached to aromatic carbon atoms located in different ring structures, in an organic solvent for at least one reactant at a temperature below 150° C. to form a polyamide-acid intermediate and then converting said polyamide-acid intermediate to the polyimide.

---

The present invention relates to novel polyimides which contain heterocyclic ring groups in the backbone of the polymer chain and to methods for their preparation.

The novel polyimides of the present invention comprise linear polyimides containing the repeating unit (I) 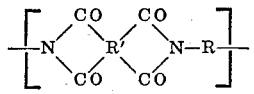

in which R' represents a tetravalent radical and preferably a tetravalent aromatic radical containing at least one ring of six carbon atoms, said ring being characterized by benzenoid unsaturation the four carbonyl groups being attached directly to separate aromatic carbon atoms of the R'-radical and each pair of carbonyl groups being attached to adjacent carbon atoms in the R'-radical, and wherein R is a divalent organic radical which contains benzimidazole, benzoxazole or benzothiazole moieties, said divalent radical containing at least two aromatic ring structures, the open valences of said R-radical being on aromatic carbon atoms located in different ring structures.

In a preferred embodiment R has the following formulas (II) 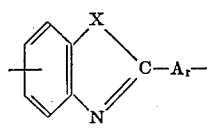

(III) 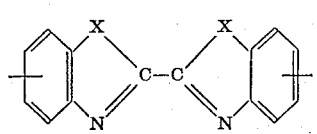

(IV) 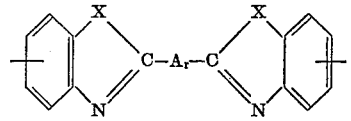

(V) 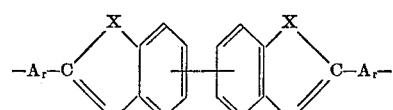

and (VI) 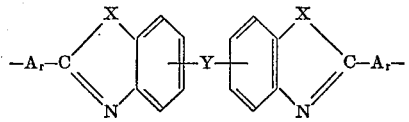

wherein X is oxygen, imine or sulfur, $A_r$ is a divalent benzenoid radical having formulas such as

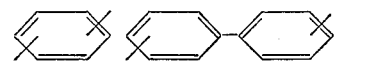

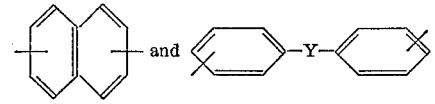

and wherein Y is a divalent radical such as alkylene radicals having 1 to 3 carbon atoms, —O—, —S—, and —SO$_2$—.

The polyimides of the present invention are characterized by extraordinarily high thermal and oxidative stability, good film forming characteristics, toughness and other mechanical properties which make them particularly suitable as molding and laminating resins, films, coating vehicles and the like. The outstanding electrical properties of these resins make them particularly useful for insulating applications involving high temperatures and corrosive exposures.

The polyimides are prepared by reacting at least one organic diamine having the general formula (VIII)          $H_2N—R—NH_2$ with at least one tetracarboxylic dianhydride having the general formula (VIII) 

wherein R and R' have the above indicated meaning. The polymerization reaction is generally carried out as a two-step reaction in which the first step a polyamide-acid is formed having recurring units of the general formula (IX) 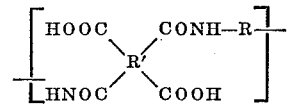

The resulting polyamide-acid which, however, can contain some polyimide units, is then preferably formed into the desired structure and thereafter further reacted to convert the amide-acid groups to imide groups. It is generally preferred, although not essential, to shape the polymeric product before complete conversion to the polyimide structure since the polyamide-acid has superior fabricating properties as compared to the polyimide. In coating applications it is similarly preferred to employ the polyamide-acid form of the polymer rather than the polyimide form because of the greater solubility of the polyamide-acid.

The polymerization of the dianhydride with the diamine to the polyamide-acid is generally carried out by admixing the components in the presence of a diluent which is at least a solvent for one of the components and preferably a solvent for both components under preferably anhydrous conditions, at temperatures below about 150° C. and preferably at temperatures below 100° C. More than one diamine and more than one dianhydride can be employed. Additionally it is possible to employ in combination with the heterocyclic diamines of the present invention such diamines as have been previously employed in the formation of polyimides.

The ratio in which the dianhydride and the diamine are employed has a significant effect on the molecular weight of the resulting polyamide-acid and should therefore be closely controlled. In general the highest molecular weights are obtained when substantially stoichiometric quantities of the diamine and dianhydride are employed and such is preferred. Furthermore, if non-stoichiometric ratios are employed it is preferred to employ an excess of the diamine since an excess of the dianhydride tends to degrade the polymer. The extent of the excess of the diamine, therefore, provides a means of controlling the molecular weight of the resulting polyamide-acid.

Although for many applications, particularly the formation of solid shapes such as films, fibers, and molded articles, high molecular weight polyamide-acids result in polyimides of superior properties; other applications do not require a high molecular weight polyamide-acid to obtain the desired polyimide properties. Thus compositions in which less than substantially 100% of the amine groups have reacted with the acid anhydride groups are useful. It is only necessary that the resulting polyamide-acid have sufficient polyamide-acid linkages to be useful in the intended application. In coating applications, for example, it may be preferable to employ polyamide-acids which are not polymerized to the highest possible molecular weight in order to avoid unsuitably high viscosities in the coating compositions at the desired concentrations of the resin vehicle. It should be recognized that further increases in molecular weight result during the conversion of the amide-acid groups to the imide groups. In general the average molecular weight of the polyamide-acid formed should be such that the polymer has an inherent viscosity of at least 0.1 and preferably of greater than 0.3 wherein the inherent viscosity is determined employing a 0.5 weight percent polymer solution in a suitable solvent at 25° C.

The diluents which are employed in the formation of the polyamide-acid are liquids which do not substantially react with the functional groups of the reactants and which are capable of dissolving at least one of the reactants and preferably both of the reactants. Solvents capable of dissolving both reactants are normally also solvents for the polymer formed. The preferred method of polymerizing the novel polyimides of the present invention is therefore a solution polymerization. In general, inert polar organic solvents which exhibit a high dipole moment are useful. The normally liquid organic solvents of the N,N-dialkylcarboxylamide class are, therefore, useful as solvents in the process of this invention. The preferred solvents are the lower molecular weight members of this class wherein the acids have from 1 to 3 carbon atoms, particularly N,N-dimethylformamide and N,N-dimethylacetamide. These solvents are preferred because of their ready availability, excellent solvent power for both reactants and resulting polymer, and ready evaporation, displacement, or diffusion. Other typical compounds of this class of solvents include N,N-diethylformamide, N,N - diethylacetamide, N,N - dimethylmethoxyacetamide, and N-methylcaprolactam. Other suitable organic polar solvents include tetramethylurea, dimethyl sulfoxide, N-methyl-2-pyrrolidone, pyridine, dimethylsulfone, hexamethyl phosphoramide, tetramethylene sulfone, butyrolactone, and mixture of the solvents enumerated hereinabove. These solvents can furthermore be employed in combination with other diluents such as benzene, benzonitrile, dioxane, furane, xylene, and toluene which are not satisfactory solvents for the reagents and polymer by themselves.

The quantity of diluent employed in the polymerization can be varied widely but should be sufficient to prevent excessive viscosities in the resulting reaction product which would interfere in the temperature control of the reaction mixture and in the further handling of the polyamide-acid. Optimum quantities of solvent will depend on the intended utility of the polymer. For forming the polyamide-acid into shaped articles concentrations as high as 40% of the polymer in 60% of solvent are suitable. In coating applications, on the other hand, lower polymer concentrations requiring larger quantities of diluent may be preferred. In general diluents are employed such that the resulting polymer solution has a solids content of 0.5 to 50% by weight of the composition.

Anhydrous conditions are desirable since moisture affects the balance of the reactive anhydride to the amine groups in hydrolyzing anhydride groups to unreactive acid groups. For the same reasons it is prefered to employ the reagents in the purest form possible.

Although polymerization temperatures as high as 150° C. can be employed it is generally preferred to employ temperatures below 100° C. and particularly temperatures in the range of —20 to 50° C. The formation of the polyamide-acid occurs rapidly at all temperatures although higher molecular weights are generally obtained at lower temperatures. Increasingly higher reaction temperatures, particularly above 50 to 60° C., will result in increasingly higher ratios of imide to amide-acid groups in the resulting polymeric material and hence temperature is employed to produce the desired ratio of these groups in the resulting polymeric product.

Neither reaction time nor pressure is a significant variable in the polymerization since the rate of polymerization is extremely rapid and since none of the components require pressurization although such is, of course, not excluded from the scope of the process described. In conducting the polymerization it is generally preferred to add the dianhydride slowly to a solution of the amine. Upon complete addition of the anhydride the polymerization is usually continued until no further reaction takes place as measured by heat release of the exothermic reaction. In order to maintain the desired reaction temperature, cooling means are preferably employed. The polyamide-acid, as indicated above, is preferably obtained in the form of a solution. The polymer is readily isolated by precipitation and filtration employing a miscible non-solvent.

The conversion of the polyamide-acid to the polyimide can be accomplished by various means of which heating the polyamide-acid is preferred. Generally temperatures in the range of 150° to 450° C. are employed, although polyimide formation using longer exposures at lower temperatures and shorter exposures at higher temperatures is possible. Conversion to the polyimide can also be accomplished by use of dehydrating agents, particularly, monocarboxylic acid anhydrides such as benzoic acid anhydride, acetic acid anhydride, or combinations of such anhydrides with tertiary amines.

The dianhydrides which are employed in the formation of the novel polyimides of the present invention are those which have heretofore been employed in the formation of polyimides and include the following:

3,3',4,4'-benzophenone tetracarboxylic dianhydride;
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfide dianhydride; and
benzene-1,2,3,4-tetracarboxylic dianhydride.

In general all dianhydrides which contain an aromatic structure in the sense of containing at least one ring of six carbon atoms having benzenoid unsaturation can be suitably employed. The ring can be fused to one or more other rings such as in naphthalene and perylene. The carbonyl groups of the anhydrides should be attached to carbon atoms of the aromatic ring structure and each pair should be attached to adjacent carbon atoms.

The diamines employed with the dianhydrides to form the novel polyamides of the present invention contain from one to two benzoxazole, benzimidazole or benzothiazole structures having attached thereto an amine group or an aromatic radical containing an amine substituent. The amine groups of the diamines employed in the present invention are attached to different aromatic carbon atoms of the nucleus, each of said carbon atoms being located in a separate aromatic ring structure.

The preferred heterocyclic diamines employed in the process of the present invention have the formulas

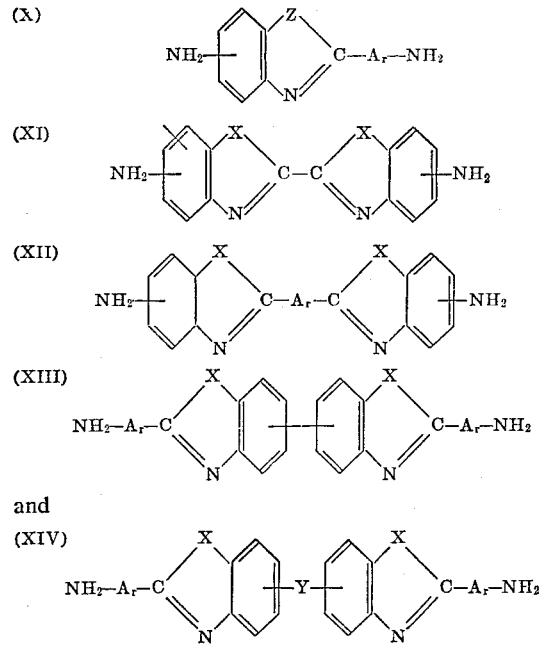

wherein X is oxygen —O—, imine —NH— or sulphur —S—, $A_r$ is a divalent radical having formulas such as

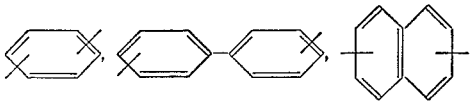

and

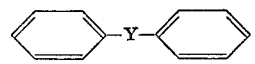

and Y is a divalent radical such as an alkylene radical of 1 to 3 carbon atoms, oxygen, sulfur and sulfonyl. The foregoing description of the diamines employed in the formation of the novel polyimides will make it apparent that the diamines employed are mono- and bis benzoxazole, benzimidazole and benzothiazole diamines. The preferred of the diamines defined by the foregoing formulas are those in which the $A_r$ radical is a phenylene or a biphenyl radical. Specific examples of the diamines include:

5-amino-2(p-aminophenyl) benzoxazole;
5-amino-2(p-aminophenyl) benzimidazole;
5-amino-2(p-aminophenyl) benzothiazole;
5-amino-2(m-aminophenyl) benzoxazole;
5-amino-2(m-aminophenyl) benzimidazole;
2,2'-di-p-aminophenyl-5,5'-bibenzimidazole;
2,2'-di-m-aminophenyl-5,5'-bibenzimidazole;
2,2'-di-p-aminophenyl-5,5'-bibenzoxazole;
2,2'-di-p-aminophenyl-5,5'-dibenzothiazole;
2,2'-di-p-aminophenyl-5,5'-dibenzimidazolyl methane;
2,2'-di-p-aminophenyl-5,5'-dibenzimidazolyl ether;
2,2'-di-p-aminophenyl-5,5'-dibenzimidazolyl sulfide;
2,2'-di-p-aminophenyl-5,5'-dibenzoxazolyl ether;
2,2'-di-m-aminophenyl-5,5'-bibenzoxazole;
2,2'-di-m-aminophenyl-5,5'-bibenzothiazole;
5-amino-2(m-aminophenyl) benzothiazole;
5,5'-diamino-2,2'-bisbenzoxazole;
5,5'-diamino-2,2'-bisbenzothiazole;
5,5'(6,6')-diamino-2,2'-bisbenzimidazole;
2,2'-di(m-aminophenyl)-5,5'-dibenzimidazolyl methane;
2,2'-di(m-aminophenyl)-5,5'-dibenzimidazolyl ether;
2,2'-di(m-aminophenyl)-5,5'-dibenzimidazolyl sulfide;
2,2'-di(m-aminophenyl)-5,5'-dibenzimidazolyl sulfone;
2,2'-di(p-aminophenyl)-5,5'-dibenzimidazolyl sulfone;
2,2'-di(m-aminophenyl)-5,5'-bisbenzoxazole;
2,2'-di(m-aminophenyl)-5,5'-bisbenzothiazole;
2,2'-di(p-aminophenyl)-5,5'-dibenzoxazolyl methane;
2,2'-di(p-aminophenyl)-5,5'-dibenzoxazolyl ether;
2,2'-di(p-aminophenyl)-5,5'-dibenzoxazolyl sulfide;
2,2'-di(p-aminophenyl)-5,5'-dibenzoxazolyl sulfone;
2,2'-m-phenylenebis(5-aminobenzoxazole);
2,2'-p-phenylenebis(5-aminobenzoxazole);
2,2'-m-phenylenebis(5-aminobenzothiazole);
2,2'-p-phenylenebis(5-aminobenzothiazole);
2,2'-m-phenylenebis[5(6) aminobenzimidazole]; and
2,2'-p-phenylenebis[5(6) aminobenzimidazole].

The diamines employed in the process of the present invention can be prepared, for example, those having the general Formula X, by the reaction of aromatic compounds containing in addition to a nitro group attached to an aromatic ring carbon, a hydroxy group and an amine group on adjacent carbon atoms of the aromatic ring structure with nitro-substituted aryl acid chlorides, nitro-substituted aryl acids, nitro-substituted aryl aldehydes. The resulting product is cyclodehydrated in the solid phase or in a solvent system such as polyphosphoric acid to a dinitro-substituted benzoxazole. The two nitro groups are then hydrogenated using standard procedures. The corresponding benzimidazoles and benzothiazoles are obtained from nitro-substituted aromatic compounds above-described in which the hydroxyl group is replaced by another amino group and by a mercapto group. The azo-methine, derived from the reaction of a nitro-substituted aryl aldehyde with a nitro-substituted o-aminophenol, can be subjected to oxidative ring closure by reagents such as lead tetraacetate, potassium permanganate, or in some cases nitrobenzene to afford the corresponding benzoxazoles. Other methods include the nitration of benzoxazoles followed by hydrogenation. Suitable aromatic compounds include 4-nitro-2-aminophenol, 5-nitro-2-aminophenol, 4-nitro-o-aminothiophenol, 4-nitro-o-phenylene diamine, 5-nitro-o-phenylene diamine, 4'-nitro-3-amino-4-hydroxy-biphenyl, and 1-hydroxy-2-amino-5-nitronaphthalene. Suitable acidic compounds include p-nitro-benzoyl chloride, m-nitrobenzoyl chloride, p-nitro-benzoic acid and m-nitrobenzoic acid.

The use of aromatic compounds containing two aromatic rings each of which has an amino group and a hydroxyl group or two amino groups or an amino group and a mercapto group in combination with the ntiro-substituted aryl acid chloride in the described reactions result in the formation of the diamines defined by Formulas XIII and XIV. Suitable polyfunctional aromatic compounds include 3,3'-dihydroxybenzidine,
3,3'-dihydroxy-4,4'-diaminodiphenyl ether,
3,3'-diaminobenzidine,
3,3'-dimercaptobenzidine,
3,3'-dihydroxy-4,4'-diaminodiphenyl methane,
3,3',4,4'-tetraaminodiphenyl ether,
3,3',4,4'-tetraaminodiphenyl methane,
3,3',4,4'-tetraaminodiphenyl propane,
3,3',4,4'-tetraaminodiphenyl sulfide,
3,3',4,4'-tetraaminodiphenyl sulfone, and
3,3',4,4'-tetraaminodiphenyl propane.

The reaction of diacid dichlorides of dicarboxylic acids with the described nitro-substituted monoaromatic compounds containing adjacent hydroxy and amino substituents or two adjacent amino substituents or adjacent mercapto and amino substituents followed by cyclodehydration and hydrogenation results in the diamines set forth in Formulas XI and XII. Suitable acidic materials include oxalic acid, terephthaloyl dichloride, isophthaloyl chloride, 1,6-dicarboxylic naphthalene dichloride and 4,4'-dicarboxylic biphenyl dichloride.

It is to be understood, however, that the preparation of the heterocyclic diamines is not limited to the particular methods described and that other methods can be employed.

The invention is further illustrated by the following examples in which all units of quantity are by weight unless otherwise stated.

EXAMPLE 1

To a solution of 60 parts of 4-nitro-2-amino-phenol in 240 parts of N-methyl pyrrolidone is added an equimolar amount of p-nitro-benzoyl chloride. The solution was decanted into a large excess of water and the amide formed was collected by suction filtration. After drying one part of the amide was treated with 5 parts of polyphosphoric acid, 115%, at 190 to 210° C. for 20 minutes. The polyphosphoric acid reaction mixture was poured into a large excess of water and the dinitrobenzoxazole compound collected by suction filtration. After being washed with water until acid-free, the dinitrobenzoxazole was air dried initially and then vacuum dried at 100° C. The material was obtained in a 90% yield, M.P. 258–259° C. The dinitrobenzoxazole, 100 parts, was dissolved in 300 parts of tetrahydrofuran, placed in a Parr hydrogenation apparatus with 5 parts of 5% platinum on carbon catalyst and hydrogenated at 200 p.s.i. $H_2$ pressure at room temperature for 20 minutes. After filtration and evaporation, a tan colored solid material was obtained in quantitative yield. The material, 5-amino-2(p-aminophenyl) benzoxazole, was recrystallized twice from dilute ethanol to give a product having a melting point of 229–230° C.

Under a nitrogen atmosphere 112.5 parts of 5-amino-2(p-aminophenyl) benzoxazole was dissolved in 4000 parts of a 50:50 mixture of purified N,N-dimethylacetamide and N-methyl-2-pyrrolidone. To this solution was added 109 parts of purified pyromellitic dianhydride. The solution temperature exothermed from 25° C. to 35° C. and became somewhat viscous. After 20 minutes the solution had again come to room temperature. The polymer was isolated by pouring the polymeric solution under agitation into a large excess of distilled water. The polyamide-acid precipitated, was collected by suction filtration, washed on the filter twice with hot absolute ethanol and then dried in a vacuum oven for two hours at 80° C. The isolated polyamide-acid of the benzoxazole-containing diamine and the tetracarboxylic acid had an inherent viscosity of 0.6 in dimethyl sulfoxide at room temperature (concentration 0.5 g./100 ml.). The polymer was soluble in N-methyl-2-pyrrolidone. A solution thereof was employed to cast films of the polymer. The free films, after drying in a vacuum oven at 80° C. for three hours, had excellent clarity and good tensile strength. The drying caused some conversion of amide-acid groups to imide groups. The remaining amide-acid groups of the polymer were converted to imide groups by heating at 200° C. for a period of three hours. The resulting films had excellent color, flexibility, tensile strength and crease resistance. No decomposition of the polymer was noted by exposure to temperature as high as 450° C.

EXAMPLE 2

Employing the polymerization procedure of Example 1, 5-amino-2(p-aminophenyl) benzoxazole is condensed with benzophenone tetracarboxylic dianhydride. A polyamide-acid of the benzoxazole-containing diamine and the tetracarboxylic acid is obtained which is converted to the corresponding polyimide by heating after casting from solution. Tough and temperature stable films are obtained.

EXAMPLE 3

Employing the procedure set forth in Example 1, 5-amino-2(m-aminophenyl) benzoxazole, M.P. 250–251° C., is prepared employing 4-nitro-2-aminophenyl and m-nitrobenzoyl chloride. A 75% yield of the benzoxazole is obtained.

Employing the polymerization procedure of Example 1, a polyamide-acid is prepared from the 4-amino-2(m-aminophenyl) benzoxazole and pyromellitic dianhydride. The resulting polyamide-acid of the benzoxazole-containing diamine and the tetracarboxylic acid has an inherent viscosity of 0.59 in dimethyl sulfoxide. A film cast from a solution of the polyamide-acid is completely converted to the polyimide by heating at 200° C. for three hours. The properties of the film are substantially as described for the polyimide film of Example 1.

EXAMPLE 4

To 10 parts of 3,3'-diamino benzidine tetrahydrochloride was added two equivalents of p-amino-benzoic acid in 50 parts of the polyphosphoric acid employed in Example 1. The mixture was heated for 12 hours at 150° C. The product was precipitated by pouring the mixture into water. The precipitate was extracted with methanol, reprecipitated, dried and recrystallized twice from pyridine and water. On heating to 300° C. in a vacuum oven, a solid was obtained and identified as 2,2'-di-p-aminophenyl-5,5'-bibenzimidazole, M.P. 321.5–323° C.

Under a nitrogen atmosphere 208 parts of 2,2'-di-p-aminophenyl-5,5'-bibenzimidazole was dissolved in 3000 parts of N,N'-dimethylformamide. The solution was stirred until all the monomer had dissolved and then 109 parts of pyromellitic dianhydride was added. The temperature of the solution exothermed from 25° to 55° C. during the addition of the anhydride and after about three minutes the polymer precipitated from solution. The polyamide-acid of the imidazole-containing diamine and the tetracarboxylic acid was isolated by pouring the reaction mixture into excess water under agitation. The solid polyamide-acid was digested twice with refluxing absolute ethanol, filtered and dried at 80° C., 1 mm. Hg for three hours. The polyamide-acid polymer, inherent viscosity 0.40 was dissolved in dimethylacetamide and cast into films. After heating at 250° C. for three hours in a vacuum oven, the amide-acid groups in the film were converted to imide groups. The resulting film had excellent tensile strength and crease resistance and was thermally stable to temperatures above 450° C.

The foregoing examples are illustrative of the formation of the novel polyimides of the present invention. It will be apparent that the formation of the polyamide-acid is accomplished rapidly even at room temperature by simply combining the two monomeric components and that the conversion of the polyamide-acids to polyimides results on heating. The foregoing procedures are equally applicable to other dianhydrides and diamines falling within the scope of the novel polyimides defined hereinabove but not specifically illustrated in the examples.

The novel polyimides are useful in the formation of shaped objects, unsupported films, filaments, laminates and coatings. In coating applications employing the polyamide-acid intermediate, the coating composition can be modified by additives such as pigments, e.g. titanium dioxide. These coating compositions can be applied to a variety of substrates, for example, metals, e.g. copper, brass, aluminum and steel, such metals being in the form of wire, sheeting, fiber or screening; to glass; and to other polymeric materials. The polyamide-acid coatings are then converted to polyimide coatings by such methods as baking. Films of the polyimides of the present invention can be employed in all applications heretofore developed for polyimide films such as high temperature insulation in transformers, capacitors, coil and cable wrappings, as printed circuit backing, as insulating layers in flat wire and cable assemblies, as liners in pipes and containers, and similar applications.

What is claimed is:

1. A polyimide consisting essentially of repeating units of the formula

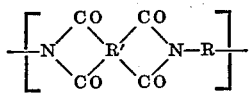

wherein R' represents a tetravalent aromatic radical containing at least one ring of six carbon atoms, said ring being characterized by benzenoid unsaturation, the four carbonyl groups being attached directly to separate aromatic carbon atoms of the R'-radical and each pair of carbonyl groups being attached to adjacent carbon atoms in the R'-radical and wherein R is a radical having formulas selected from the class consisting of

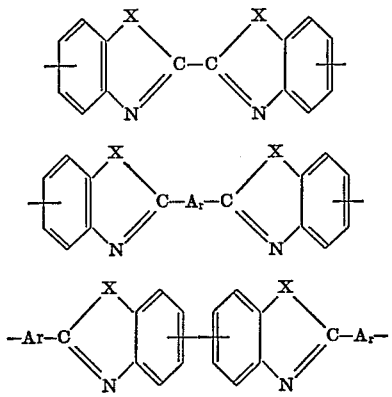

and

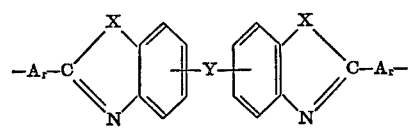

in which X is oxygen, imine or sulfur, Ar is a divalent benzenoid radical having formulas selected from the class consisting of

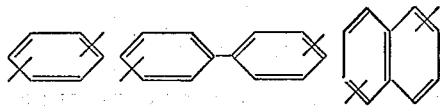

and

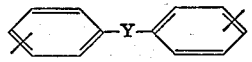

and wherein Y is a divalent radical selected from the class consisting of alkylene radicals having 1 to 3 carbon atoms, —O—, —S—, and SO$_2$.

2. The polyimide of claim 1 wherein X is oxygen.

3. The polyimide of claim 1 wherein R has the formula

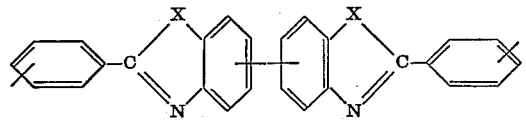

and X is oxygen, imine or sulfur.

4. The polyimide of claim 3 wherein X is —NH—.

5. The polyimide of claim 1 wherein R' has the formula

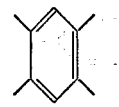

6. The polyimide of claim 1 wherein R' has the formula

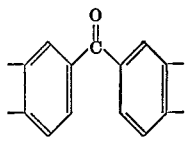

7. The polyimide of claim 1 wherein R has the formula

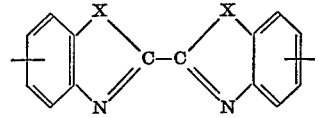

8. The polyimide of claim 1 wherein R has the formula

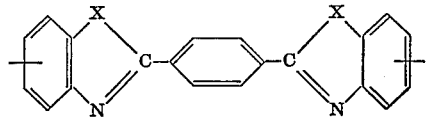

9. The product of claim 1 in the form of a film.

10. The product of claim 1 in the form of a fiber.

11. A polyimide consisting essentially of repeating units of the formula

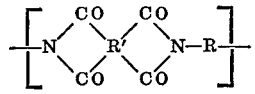

wherein R' is a tetravalent aromatic hydrocarbon radical, the four carbonyl groups being attached directly to separate aromatic carbon atoms of the R' radical and each pair of carbonyl groups being attached to adjacent carbon atoms in the R' radical and wherein R is a radical of the formula

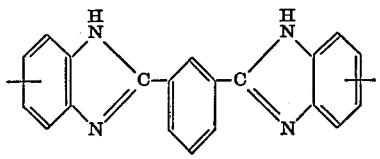

12. A polyimide consisting essentially of repeating units of the formula

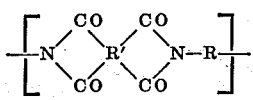

wherein R' is a tetravalent aromatic hydrocarbon radical, the four carbonyl groups being attached directly to separate aromatic carbon atoms of the R' radical and each pair of carbonyl groups being attached to adjacent carbon atoms in the R' radical and wherein R is a radical of the formula selected from the group consisting of

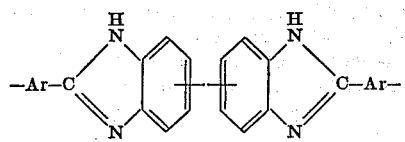

and

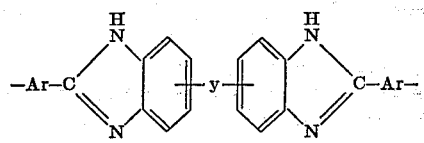

wherein Ar is selected from the group consisting of

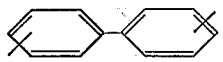

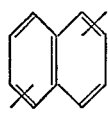

and

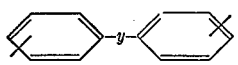

wherein y is a member selected from the group consisting of —CH$_2$—, —O—, —S—, and —SO$_2$—.

13. A polyimide consisting essentially of repeating units of the formula

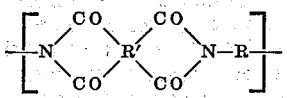

wherein R' is a tetravalent aromatic hydrocarbon radical, the four carbonyl groups being attached directly to separate aromatic carbon atoms of the R' radical and each pair of carbonyl groups being attached to adjacent carbon atoms in the R' radical and wherein R is a radical of the formula selected from the group consisting of

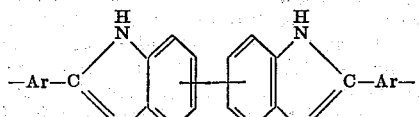

and

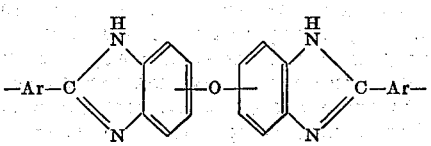

wherein Ar is phenylene.

References Cited
UNITED STATES PATENTS
3,179,634   4/1965   Edwards ............... 260—78
3,247,165   4/1966   Rodia ................. 260—65

WILLIAM H. SHORT, Primary Examiner
L. L. LEE, Assistant Examiner

U.S. Cl. X.R.
117— 124 E, 128.4, 132 B, 138.8 A; 161—227; 260—30.2, 30.6 R, 30.8 R, 30.8 D, 32.2, 32.4, 32.6 N, 37 M, 37 N, 65, 78 FF, 304, 307 D, 309.2